UNITED STATES PATENT OFFICE.

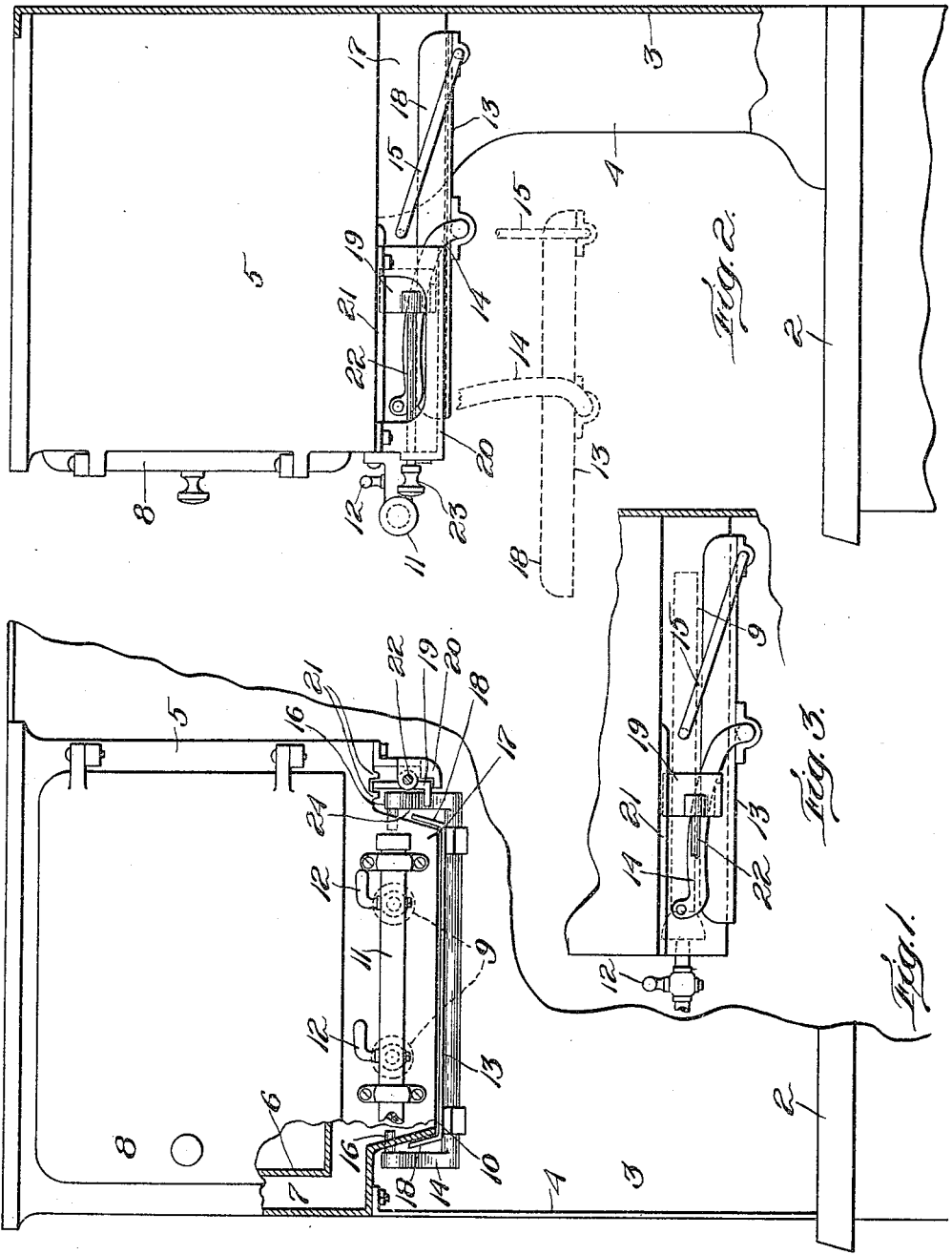

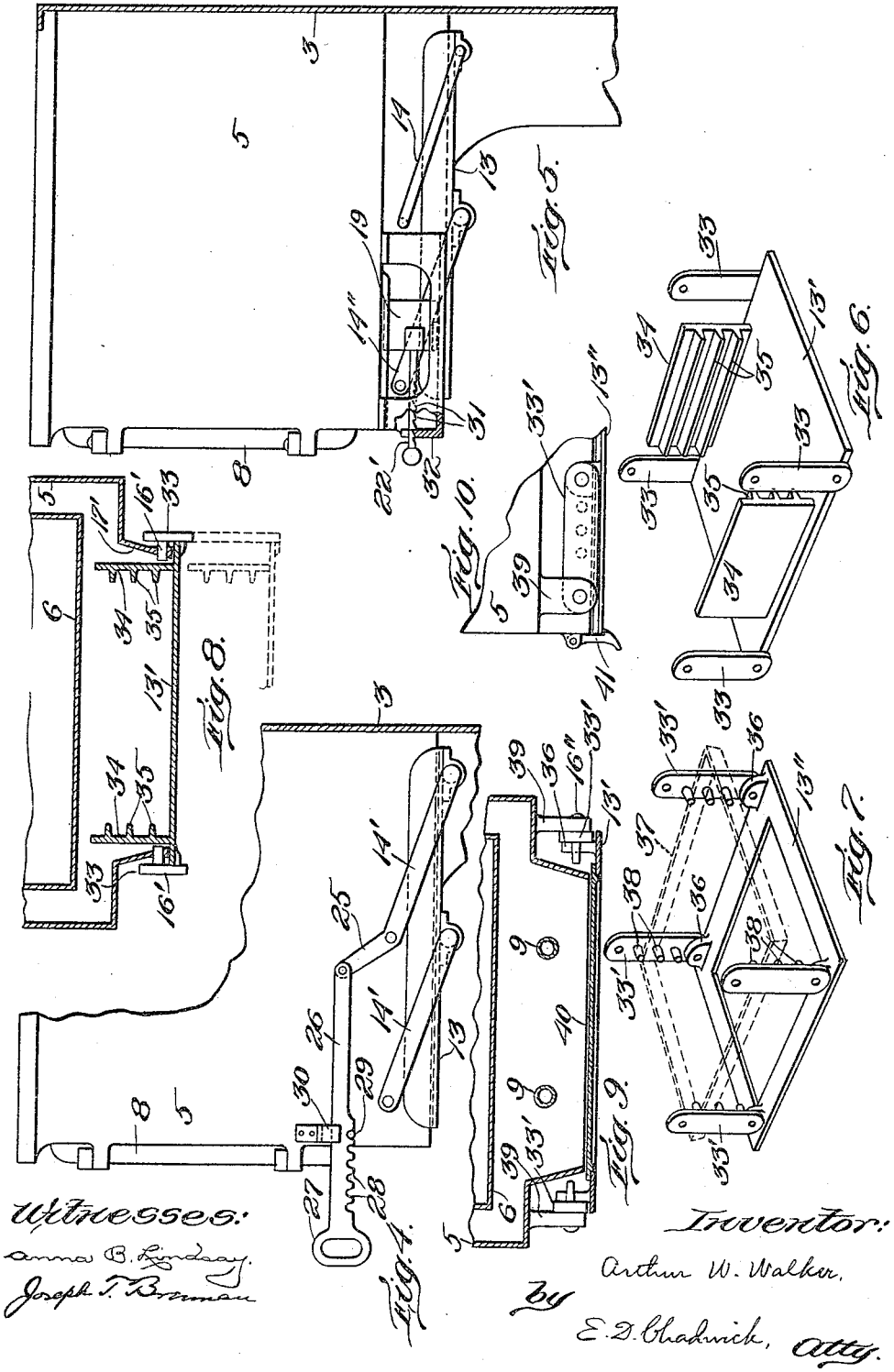

ARTHUR W. WALKER, OF MALDEN, MASSACHUSETTS, ASSIGNOR TO WALKER & PRATT MANUFACTURING COMPANY, OF BOSTON, MASSACHUSETTS, A CORPORATION OF MASSACHUSETTS.

COOKING-STOVE.

1,223,647.                    Specification of Letters Patent.        Patented Apr. 24, 1917.

Application filed September 8, 1914, Serial No. 860,507. Renewed June 3, 1916. Serial No. 101,644.

*To all whom it may concern:*

Be it known that I, ARTHUR W. WALKER, a citizen of the United States, residing at Malden, in the county of Middlesex and State of Massachusetts, have invented new and useful Improvements in Cooking-Stoves, of which the following is a specification.

This invention relates to those parts of cooking stoves which are used for broiling, and is particularly applicable to cooking stoves having a baking oven which is heated by means of one or more burners located beneath it and adapted to be used for broiling articles of food supported at a suitable distance below them, the term "burners" as herein used being intended to include gas and liquid-fuel burners and their functional equivalents, such as electric heating devices. The principal objects of my invention are to economize space by doing away with the fixed broiling oven commonly employed heretofore, to provide simple and practical means whereby the articles to be broiled may be held at any desired distance below the burners while the broiling operation is going on, and to facilitate the operations of introducing and removing the articles and attending to the same while being broiled, and with these and other objects in view I employ, in connection with one or more broiling burners, a broiler support so combined with the burners that it can be moved upward or downward with respect to the same and is maintained in substantially horizontal position during such movements, with provisions whereby the broiler may be located at various distances from the burners, according to the degree of heat required for broiling. Various means may be employed for combining the broiler support with the burners and providing for its upward and downward movements in substantially horizontal position, but preferably the support is pivotally suspended on hangers so arranged that when the support moves downward it also moves forward, since in such case the introduction, manipulation and removal of the articles to be broiled are facilitated.

In the accompanying drawings illustrating my invention:

Figure 1 is a front elevation with parts broken away, showing a portion of a gas stove containing my improvements in their preferred form;

Fig. 2 is a side elevation, partly in section, of the parts shown in Fig. 1;

Fig. 3 is a side elevation showing certain details hereinafter described;

Figs. 4 and 5 are views similar to Fig. 2 but illustrating somewhat modified constructions;

Figs. 6 and 7 are detail views illustrating modified forms of the broiler support;

Figs. 8 and 9 are sectional views showing respectively the supports of Figs. 6 and 7 combined with the baking oven; and Fig. 10 is a fragmentary side elevation showing a locking device hereinafter described.

Referring first to Figs. 1, 2 and 3, 2 indicates a support or base for the parts located above it, 3 indicates a rear wall extending vertically therefrom, 4 indicates a vertical side wall extending forward from the wall 3 at one end of the support 2, and 5 indicates a casing which is carried by the parts 3 and 4 at a suitable elevation above the support 2 and constitutes the outer or inclosing casing of a baking oven 6. A space 7 is left between the oven 6 and the outer casing 5, to serve as a flue, and said outer casing 5 is provided with the usual door 8 for closing the front of the oven and with one or more gas burners 9 extending inward beneath the bottom of the oven. These burners are located directly over an opening 10 in the bottom of the casing 5 and are supplied with gas from a pipe 11, cocks 12 being provided for controlling the supply to the respective burners. As described thus far the parts may be of any usual or suitable construction and arrangement, the particular construction illustrated being such as is commonly employed in gas-heated stoves of the cabinet type. The support 2 may consist of the main top portion or table of such a stove, or it may consist of the top of an ordinary cooking stove or range using coal as the fuel.

The form of broiler support illustrated in Figs. 1, 2 and 3 consists of a transversely-extending plate 13 pivotally suspended on two U-shaped hangers 14 and 15, the upper ends of which are provided with laterally-extending pivots 16 located in suitable horizontal bearings formed in the sides of the downwardly-extending lower portion 17 of the casing 5. The plate 13 is thus adapted to move upward and downward in the uninclosed and otherwise unoccupied space below the casing 5, and on this plate when lowered any usual or suitable form of broiler may be supported, the side edges of the plate being preferably turned upward as at 18 to serve as partial side walls for the space containing the broiler, according to the height of said side edges, thereby providing wind shields which cut off or minimize the effect of drafts of air when the broiling operation is in progress. Preferably, also, the construction is such that said plate 13 remains horizontal in all positions, but this is not essential so long as it is so nearly horizontal when lowered that the broiler will rest upon it.

The hangers 14 and 15 are so proportioned and arranged that when the plate 13 is moved upward into the position shown in Fig. 1, in which its side edges 18 embrace the side walls of the portion 17 of the casing 5, said plate closes the open bottom of the casing and thus prevents the heat of the burners 9 from being felt below the oven when said burners are used for baking only, but when said plate 13 is lowered into the position shown in dotted lines in Fig. 2 it also moves forward somewhat beyond the front of the oven, thereby making it conveniently accessible for the introduction and removal of the broiler and its contents. During the operation of broiling, however, the plate 13 is caused to occupy a suitable intermediate position in which the article to be broiled will be brought more directly beneath and closer to the burners 9, and for the purpose of holding said plate in any desired intermediate position I have shown in Figs. 1, 2 and 3 an arrangement consisting of a slide 19 located outside of the hangers 14 on one side of the oven and mounted to slide forward and backward on a bracket 20 secured to the casing 5. The top of the slide 19 is received between and guided by two downwardly-projecting ribs 21 formed on the under side of said casing. To said slide 19 is secured a forwardly-projecting rod 22 having a handle 23 at its front end, by means of which the slide may be moved forward or backward, and a laterally-projecting finger 24 is carried by the slide in position to engage the under side of the adjacent suspending arm of the front hanger 14 in such manner that when said slide is pushed backward the finger 23 will act as a cam on the under side of said arm and elevate the plate 13. By giving said hanger arm a suitable curvature, as shown in Figs. 2 and 3, the arrangement will be rendered self-locking in any position suitable for broiling, since the pressure on the finger 24 will be exerted in a direction so nearly downward that it will be ineffective to move the slide 19 against its frictional resistance. Whenever the handle 23 is pulled forward, however, it will be accompanied by a downward movement of the plate 13, which will remain in whatever position it occupies when the forward movement of said handle is stopped.

Instead of employing the arrangement shown in Figs. 1, 2 and 3 for holding the broiler support 13 in a given position the arrangement shown in Fig. 4 may be adopted, in which said support is carried by hangers 14″ having straight suspending arms, one of said arms being provided with an extension 25 which projects upwardly above its supporting pivot and is pivotally connected to the rear end of an arm 26 extending forwardly along the side of the casing 5. This arm 26 is provided at its outer end with a handle 27 and on its under side with a series of notches 28, any one of which may be caused to receive a locking pin 29 carried by the casing 5, according to the desired position of the support 13. Lateral movements of the arm 26 are prevented by a guide 30 secured to the casing 5, with its lower end overlapping the outer side of said arm 26, sufficient space being provided to permit such a lifting movement of the arm as is necessary to disengage the same from the locking pin 29. Still another arrangement for the same purpose is shown in Fig. 5, in which the slide 19 and its finger 24 are retained but the suspending arms of the front hanger 14″ are straight, the slide 19 being positively locked in any desired position by providing the under side of its operating rod 22′ with a series of notches 31, any one of which is adapted to receive the upper edge of a guiding flange 32 at the front of the casing 5.

Instead of providing a locking device for holding the broiler support at a given elevation, said support may be arranged to drop to its lowermost position when released, in which case the broiler will be adjustably supported thereon. As an example of this, Fig. 6 illustrates a construction in which the broiler support comprises a plate 13′ supported by hangers consisting of four pivotal links 33, said plate being provided with upwardly-extending side plates 34 having on their inner faces a number of opposed ledges 35, on any pair of which a broiling pan may be supported. When this construction is employed the bearings for the pivot pins 16′ at the upper ends of the links 33 are preferably located close to the bottom of the lower portion 17′ of the casing 5, and the side plates 34 are set inward from the links to such an extent as to cause them to pass upward within said lower portion of the casing when the plate 13′ is moved into its uppermost position, as shown in Fig. 8.

A somewhat similar arrangement is shown in Fig. 7, in which the broiler support 13″ has its suspending links 33' pivoted to lugs 36 extending upward from the top of said support, the broiling pan (shown in dotted lines at 37) being adjustably supported as to height by means of opposed pins 38 projecting inward from said links 33'. This form of broiler support is preferably combined with the oven by mounting the upper ends of the links 33' on pivot pins 16'' extending inward from downwardly-extending lugs 39 carried by the casing 5, as shown in Fig. 9, and is represented as having the form of a rectangular frame, being provided in such case with a removable bottom plate 40 (Fig. 9) to serve as a closure for the opening in the bottom of the casing 5 when the support is elevated.

The broiler supports 13' and 13'', in the absence of operating connections such as have been described in connection with the support 13, may be held in elevated position by any suitable means, such as a catch 41 pivoted to the front of the oven casing and adapted to engage the under side of the support as shown in Fig. 10.

It will be seen that in each of the various constructions above described a saving of space is effected by reason of the fact that when the parts employed for broiling are not in use for that purpose they are compactly folded or collapsed beneath the baking oven, thus leaving the space below the latter available for other purposes. As a result of this the baking oven may, if desired, be located at a lower elevation than would be practicable if it had a fixed broiling oven beneath it, and this is particularly advantageous when the baking oven is located above the main top portion of a coal-heated stove or a gas stove of the cabinet type, since the parts used for baking and broiling are thus made more conveniently accessible for use. It is to be observed, however, that my broiler support may be employed if desired in connection with broiling burners located elsewhere than below the bottom of a baking oven, and it will be evident that various modifications other than those above described may be made in the construction and arrangement of said support and associated parts without departing from my invention.

I claim:—

1. In a cooking stove, the combination with one or more broiling burners of parallel-motion hangers suspended adjacent to the burners, and a broiler support beneath the burners carried by the hangers at their lower ends and movable upward and downward therewith while maintained in substantially horizontal position.

2. In a cooking stove, the combination with one or more broiling burners of parallel-motion hangers suspended adjacent to the burners, a broiler support beneath the burners carried by the hangers at their lower ends and movable upward and downward therewith while maintained in substantially horizontal position, and means for raising and lowering the combined hangers and broiler support and holding them in various positions of elevation.

3. In a cooking stove, the combination with a casing having an open bottom, of one or more broiling burners located in said casing, a substantially horizontal plate movable upward and downward beneath the burners and adapted to serve as a closure for the open bottom of the casing when elevated and as a broiler support when lowered, said plate when in its lowered position being accessible from below the burners, and means for supporting the plate and maintaining it in substantially horizontal position while moved upward and downward.

4. In a cooking stove, the combination with a casing having an open bottom, of one or more broiling burners located in said casing, a substantially horizontal plate movable upward and downward in an uninclosed space beneath the burners and adapted to serve as a closure for the open bottom of the casing when elevated and as a broiler support when lowered, and means comprising parallel-motion hangers for supporting the plate and providing for its upward and downward movements.

5. In a cooking stove, the combination with one or more broiling burners, of a substantially horizontal broiler support movable upward and downward in an uninclosed space beneath the burners and having upwardly-extending side portions forming wind shields, and means for moving the support upward and downward while maintaining it in substantially horizontal position.

6. In a cooking stove, the combination with a casing having an open bottom, of one or more broiling burners located in said casing, a substantially horizontal plate movable upward and downward in an uninclosed space beneath the burners and adapted to serve as a closure for the open bottom of the casing when elevated and as a broiler support when lowered, said plate having upwardly extending side portions forming wind shields, and means for supporting the plate and maintaining it in substantially horizontal position while moved upward and downward.

7. In a cooking stove, the combination with a baking oven and a casing inclosing the same and having an open bottom, of one or more burners located in the lower portion of the casing and beneath the oven, a substantially horizontal plate movable upward and downward beneath the burners and adapted to serve as a closure for the bottom of the casing when elevated and as a broiler support when lowered, said plate when in its lowered position being accessible from below the burners, and means for supporting the plate and maintaining it in substantially horizontal position while moved upward and downward.

8. In a cooking stove, the combination with a baking oven and a casing inclosing the same, and having an open bottom, of one or more burners located in the lower portion of the casing and beneath the oven, a substantially horizontal plate movable upward and downward in an uninclosed space beneath the burners and adapted to serve as a closure for the open bottom of the casing when elevated and as a broiler support when lowered, and means comprising parallel motion hangers for supporting the plate and providing for its upward and downward movements.

9. In a cooking stove, the combination with one or more broiling burners of parallel-motion hangers pivotally suspended at their upper ends on opposite sides of the burners, and means carried by said hangers for supporting a broiler in substantially horizontal position at various elevations beneath the burners.

10. In a cooking stove, the combination with one or more broiling burners of parallel hangers pivotally suspended at their upper ends on opposite sides of the burners, and a broiler support pivoted to the lower ends of said hangers and movable upward and downward in substantially horizontal position beneath the burners.

11. In a cooking stove, the combination with one or more broiling burners of parallel hangers pivotally suspended at their upper ends on opposite sides of the burners, and a broiler support pivoted to the lower ends of said hangers and movable upward and downward in substantially horizontal position beneath the burners, said support having upwardly-extending side portions forming wind shields.

12. In a cooking stove, the combination with one or more broiling burners of parallel hangers pivotally suspended at their upper ends and arranged to extend rearward from their supporting pivots when in their uppermost position, and a broiler support pivoted to the lower ends of said hangers and movable upward and downward beneath the burners.

13. In a cooking stove, the combination with one or more broiling burners of parallel hangers pivotally suspended at their upper ends and arranged to extend rearward from their supporting pivots when in their uppermost position, a broiler support pivoted to the lower ends of said hangers and movable upward and downward beneath the burners, and means for maintaining said support at different elevations.

14. In a cooking stove, the combination with a casing having an open bottom of one or more broiling burners located in said casing, parallel hangers pivoted at their upper ends to the casing on opposite sides of the burners, and a plate pivotally connected to the lower ends of said hangers and movable upward and downward in substantially horizontal position beneath the burners, said plate serving as a closure for the open bottom of the casing when elevated and as a broiler support when lowered.

15. In a cooking stove, the combination with a baking oven having one or more burners located beneath it, of parallel hangers pivotally suspended at their upper ends on opposite sides of the burners, and a broiler support pivotally connected to the lower ends of said hangers and movable upward and downward in an uninclosed space beneath said burners and oven.

16. In a cooking stove, the combination with a baking oven and a casing inclosing the same, of one or more burners located in the lower portion of the casing beneath the oven and exposed from below through an opening in the bottom of said casing, parallel hangers pivoted to the sides of the casing at their upper ends, a broiler support pivoted to the lower ends of the hangers, and means for maintaining the broiler support at different elevations beneath said burners.

17. In a cooking stove, the combination with one or more broiling burners of parallel hangers pivotally suspended at their upper ends on opposite sides of the burners, a broiler support pivoted to the lower ends of the hangers, and means operating on one of the hangers for moving the broiler support upward and downward and maintaining it at different elevations beneath the burners.

18. In a cooking stove, the combination with one or more broiling burners of a broiler support, pivotal hangers whereby said support is suspended and adapted to move upward and downward, one of said hangers being concave on its front edge, a slide movable forward and backward adjacent to the latter hanger and provided with a finger for engaging the concave edge of the same, and means for operating said slide.

In testimony whereof, I have hereunto subscribed my name this second day of September, 1914.

ARTHUR W. WALKER.

Witnesses:
E. D. CHADWICK,
EVERETT E. KENT.

Copies of this patent may be obtained for five cents each, by addressing the "Commissioner of Patents, Washington, D. C."